United States Patent
Gomolko et al.

(10) Patent No.: US 10,005,543 B2
(45) Date of Patent: Jun. 26, 2018

(54) ACTUATOR FOR FLIGHT CONTROL SURFACE

(71) Applicant: SAFRAN ELECTRONICS & DEFENSE, Boulogne Billancourt (FR)

(72) Inventors: Oleg Gomolko, Boulogne Billancourt (FR); Etienne Merlet, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 63 days.

(21) Appl. No.: 15/318,066

(22) PCT Filed: Jun. 12, 2015

(86) PCT No.: PCT/EP2015/063247
§ 371 (c)(1),
(2) Date: Dec. 12, 2016

(87) PCT Pub. No.: WO2015/189424
PCT Pub. Date: Dec. 17, 2015

(65) Prior Publication Data
US 2017/0129589 A1    May 11, 2017

(30) Foreign Application Priority Data
Jun. 13, 2014 (FR) ...................................... 14 55451

(51) Int. Cl.
*B64C 13/30* (2006.01)
*B64C 13/50* (2006.01)
(52) U.S. Cl.
CPC .............. *B64C 13/30* (2013.01); *B64C 13/50* (2013.01)

(58) Field of Classification Search
CPC ................................ B64C 13/30; B64C 13/50
See application file for complete search history.

(56) References Cited

U.S. PATENT DOCUMENTS 6,270,039 B1 * 8/2001 Linjama .................... B64C 9/02
244/131
6,467,733 B1 * 10/2002 Young ....................... B64C 9/16
244/213

FOREIGN PATENT DOCUMENTS

EP          1380500 A2    1/2004

* cited by examiner

*Primary Examiner* — Timothy D Collins
*Assistant Examiner* — Keith L Dixon
(74) *Attorney, Agent, or Firm* — Muncy, Geissler, Olds & Lowe, P.C.

(57) ABSTRACT

An actuator for hinging a first element to a second element about a first pivot axis (A1), the actuator comprising a motor-drive device, a first mounting plate (4) connected to a body (2) of the motor-drive device, a second mounting plate (5) connected to the second element, the second mounting plate being mounted in the first mounting plate in order to pivot about the first axis, and a bush (6) mounted in the second mounting plate to pivot about a second axis (A2) perpendicular to the first axis. The motor-drive device has an outlet shaft (3) pivotable about a third axis (A3) perpendicular to the first axis and intersecting the first axis, and it is extended by a pin (7) that is pivotally received in the bush and that has a central axis (A4) intersecting the first axis and the third axis, and forming an acute angle with the third axis. An aircraft guidance assembly including such an actuator.

4 Claims, 3 Drawing Sheets

ACTUATOR FOR FLIGHT CONTROL SURFACE

The present invention relates to actuating two elements that are hinged to each other, in particular for the purpose of guiding an aircraft by moving a flight control surface such as an aileron, an elevon, a flap . . .

Aircraft generally have a fixed structure such as a wing or a tail having movable structures pivotally hinged to the fixed structure. Actuators connect the movable surfaces mechanically to the fixed structure and they are connected so as to be controlled by a control unit on which the pilot of the aircraft acts.

Actuators are known that include an electric motor having a pivotable outlet shaft. Generally, with such actuators, the electric motor has a body fastened to the fixed structure and the outlet shaft drives one element of a screw-and-nut system having its other element fastened to the movable flight control surface, and acting as a lever arm. This results in a structure that projects from the airfoil surfaces, thereby leading to aerodynamic disturbances.

An object of the invention is to propose an actuator of structure that is simple and compact, and that preferably generates little or no projections from airfoil surfaces.

To this end, the invention provides an actuator for hinging a first element to a second element about a first pivot axis, the actuator comprising a motor-drive device, a first mounting plate connected to a body of the motor-drive device, a second mounting plate connected to the second element, the second mounting plate being mounted in the first mounting plate in order to pivot about the first axis, and a bush mounted in the second mounting plate to pivot about a second axis perpendicular to the first axis. The motor-drive device has an outlet shaft pivotable about a third axis perpendicular to the first axis and intersecting the first axis, and it is extended by a pin that is pivotally received in the bush and that has a central axis intersecting the first axis and the third axis, and forming an acute angle with the third axis.

Thus, pivoting the outlet shaft about the third pivot axis drives movement of the free end of the pin along a circular path and thus drives pivoting of the second element about the first pivot axis. Turning movement is thus transmitted between two mutually orthogonal axes in a manner that is not homokinetic.

The invention also provides an aircraft guidance assembly including such an actuator.

The term "guidance assembly" is used to mean a portion of a wing, a tail, or a control surface having a surface that is movable for modifying the attitude of an aircraft.

Other characteristics and advantages of the invention appear on reading the following description of particular, non-limiting embodiments of the invention.

Reference is made to the accompanying drawings, in which.

Figure 1:
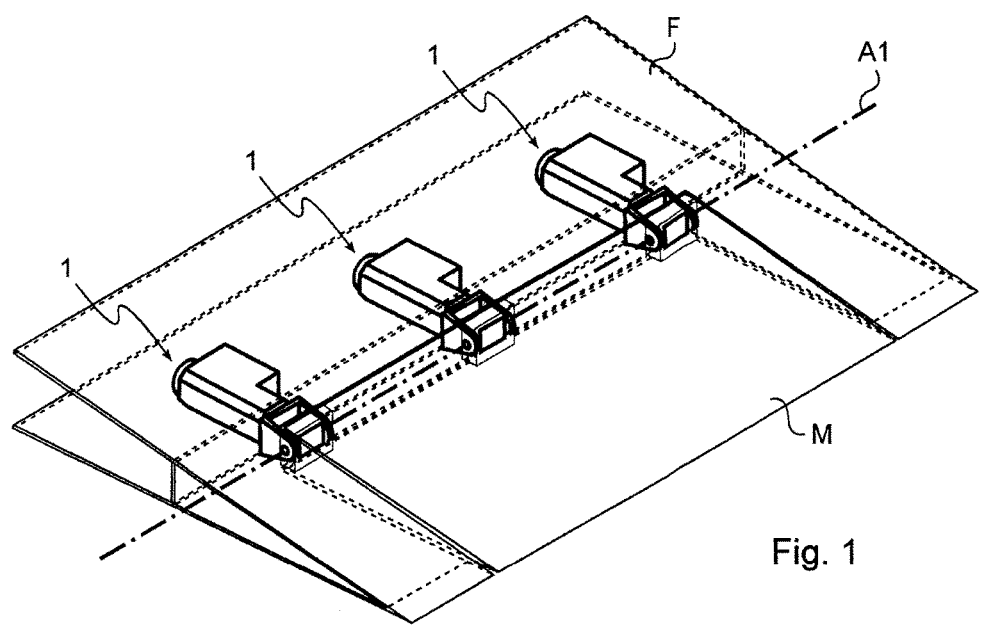
FIG. 1 is a diagrammatic perspective view of a guidance assembly of the invention.
Figure 4:
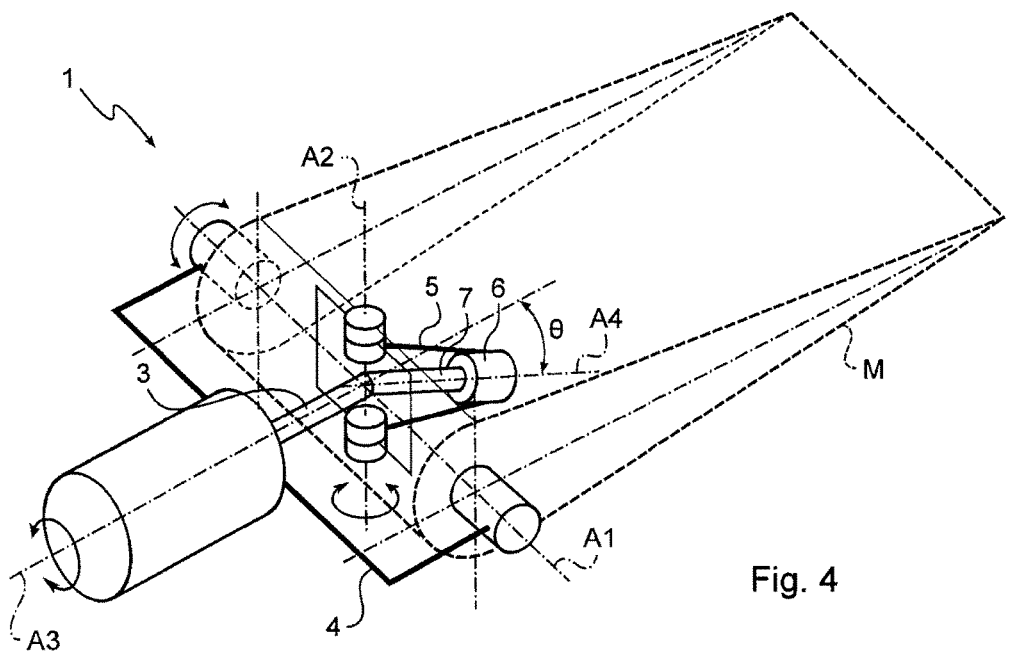
FIG. 4 is a kinematic diagram in perspective of the actuator of the invention.
Figure 2:
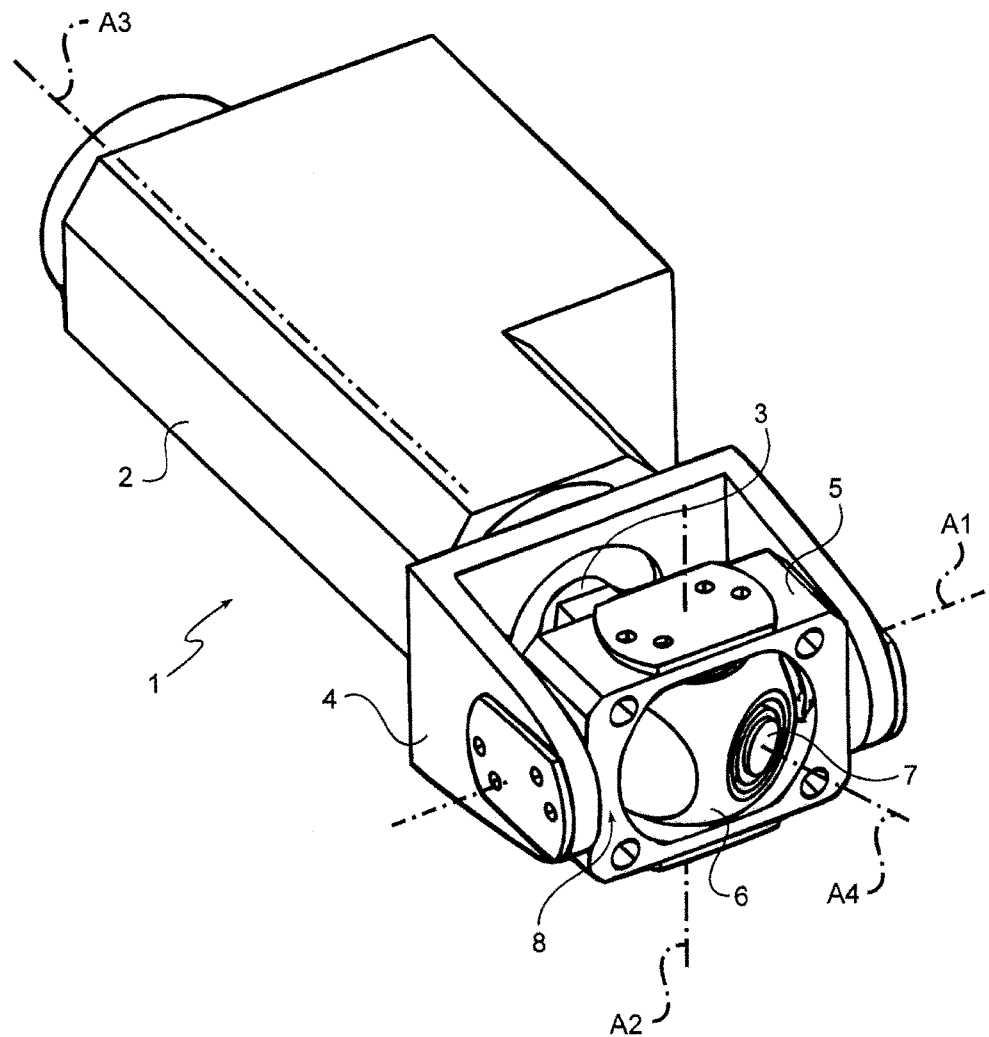
FIG. 2 is a perspective view of an actuator of the invention.
Figure 3:
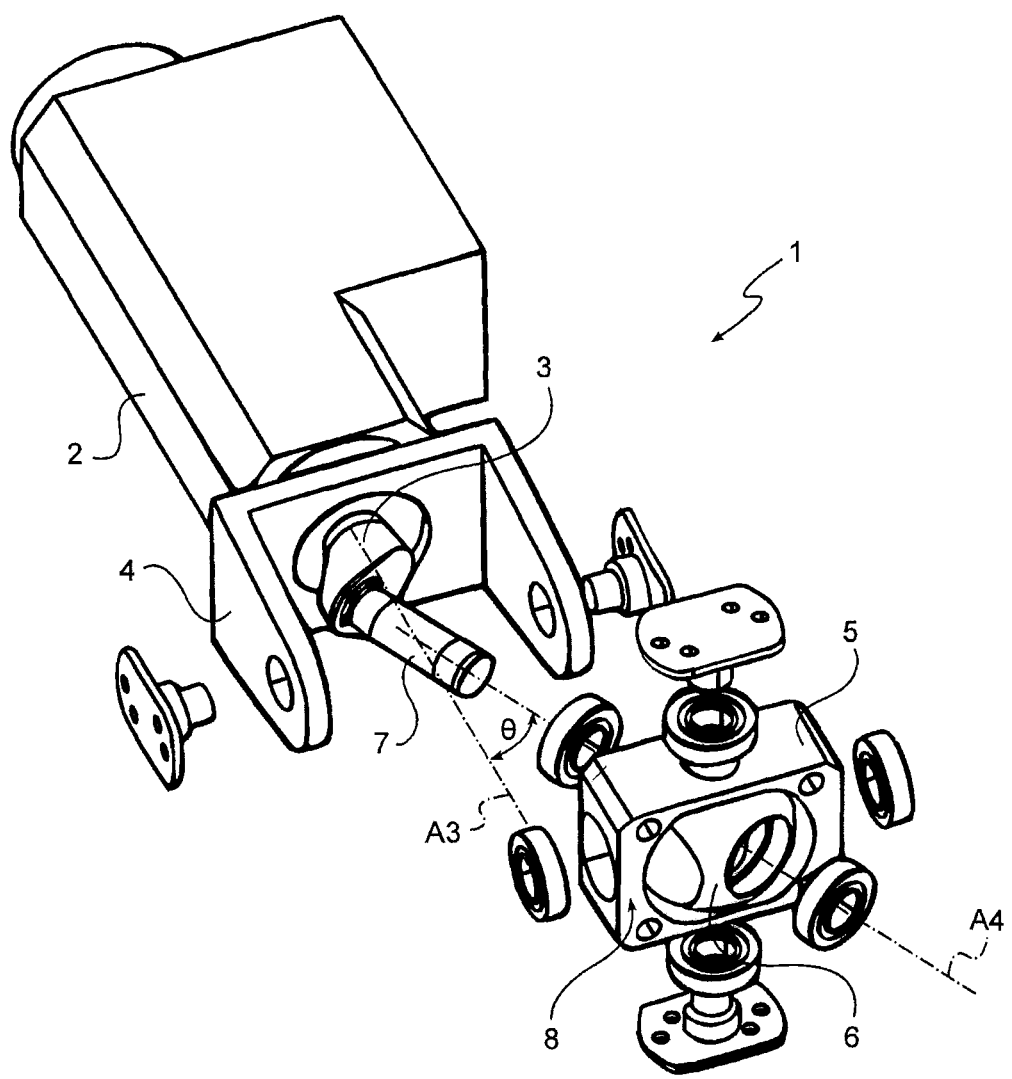
FIG. 3 is an exploded perspective view of the actuator.

With reference to FIG. 1, the invention is described herein for application to an aircraft guidance assembly comprising a fixed structure F having a movable flight control surface M hinged thereto to pivot about a first pivot axis A1.

The actuators of the invention, given overall reference 1, connect the movable flight control surface M to the fixed structure F.

Each actuator 1 comprises a motor-drive device comprising an electric motor having a body 2 and an outlet shaft 3. The body 2 is provided with means for fastening it to the fixed structure F, such as for example holes for passing fastener screws. The outlet shaft 3 may be connected to the rotor of the electric motor either directly, or via stepdown gearing. The electric motor is also provided with a control module (not shown), the control module being for connecting electrically to a control unit of the aircraft for controlling the operation of the electric motor. In a variant, the motor may be common to a plurality of actuators, each of which then has a motion transmission system connected to the common motor. The outlet shafts of the actuators are then connected to the common motor, e.g. by torsion shafts and by angle transmissions.

A first mounting plate 4 is fastened to the body 2 of the motor-drive device. The first mounting plate 4 in this example is in the form of a clevis receiving a second mounting plate 5. The second mounting plate 5 is mounted to pivot about the first axis A1.

The second mounting plate 5 is in the form of a box in which a bush 6 is mounted to pivot about a second pivot axis A2 perpendicular to the first pivot axis A1. The box of the second mounting plate has a front surface 8 that is substantially plane, parallel to the first pivot axis, and provided with fastener means for fastening to the movable flight control surface. By way of example, these fastener means may be holes for receiving fastener screws.

The motor-drive device 1 and the mounting plates 4, 5 are arranged in such a manner that the outlet shaft 3 pivots about a third pivot axis A3 that is perpendicular to the first pivot axis A1 and that intersects the first pivot axis A1.

The outlet shaft 3 is extended by a pin 7 that is pivotally received in the bush 6 and that has a central axis A4 intersecting the first pivot axis A1, the second pivot axis A2, and the third pivot axis A3 at a common point, forming an acute angle θ with the third pivot axis A3. The acute angle θ is generally less than 45°.

In the figures it can be seen that, because these four pivot axes all intersect at a common point, all of the rotary connections (i.e. the connections between the mounting plates 4 and 5; between the mounting plate 5 and the bush 6; and between the bush 6 and the pin 7) are provided by rolling bearings (specifically ball bearings). Any rotary guide member having a low coefficient of friction could be used (in particular roller bearings or needle bearings).

It can also be seen in FIG. 1 that the movable flight control surface M is connected to the fixed structure F and is guided in pivoting solely by the hinge connection between the mounting plates 4 and 5.

In operation, it can be understood that the outlet shaft 3 pivoting about the third pivot axis A3 drives a combination of movements, specifically:

pivoting of the pin 7 in the bush 6 about the central axis A4;

pivoting of the bush 6 in the mounting plate 5 about the second pivot axis A2; and pivoting of the mounting plate 5 in the mounting plate 4 about the first pivot axis Al.

This results in the movable flight control surface M pivoting about the first pivot axis Al.

This transmission is not homokinetic: this transmission mechanism is not linear since at large deflection angles the transmitted torque is lower and the speed is higher, whereas at small deflection angles, the transmitted torque is higher and the speed is lower. This lack of linearity is not penalizing when guiding an aircraft since it does not prevent the movable flight control surfaces from being able to adapt quickly to variations in the flow of air around them. In addition, management of the non-linearity can be undertaken by the control module (not shown) of the actuator.

Naturally, the invention is not limited to the embodiments described, but covers any variant coming within the ambit of the invention as defined by the claims.

In particular, the first mounting plate 4 may be formed by a portion of the fixed structure; the second mounting plate 5 may be formed by a portion of the movable flight control surface.

The actuator of the invention is usable in other applications, whether in aviation or otherwise, that require two hinged-together elements to be moved relative to each other.

The motor-drive device may be formed by a motor or by a motion transmission device.

The invention claimed is:

1. An aircraft guidance assembly comprising a fixed structure having a movable flight control surface hinged thereto to pivot about a first pivot axis, and at least one actuator for hinging a first element to a second element about a first pivot axis, the actuator comprising a motor-drive device, a first mounting plate connected to a body of the motor-drive device, a second mounting plate connected to the second element, the second mounting plate being mounted in the first mounting plate in order to pivot about the first axis, and a bush mounted in the second mounting plate to pivot about a second axis perpendicular to the first axis, the motor-drive device having an outlet shaft pivotable about a third axis perpendicular to the first axis and intersecting the first axis, the outlet shaft being extended by a pin that is pivotally received in the bush and that has a central axis intersecting the first axis and the third axis, and forming an acute angle with the third axis, connecting the fixed structure to the flight control surface.

2. An assembly according to claim 1, wherein the motor-drive device and/or the first mounting plate are fastened to the fixed structure and the second mounting plate is fastened to the flight control surface.

3. The assembly according to claim 1, wherein the hinge connection between the mounting plates connects the movable flight control surface to the fixed structure and guides it in pivoting.

4. The assembly according to claim 1, including a motor common to a plurality of actuators via a motion transmission system.

* * * * *